United States Patent
Lin

(10) Patent No.: US 10,116,152 B2
(45) Date of Patent: Oct. 30, 2018

(54) BATTERY CARTRIDGE, BATTERY CARRIER MODULE, AND BATTERY CHARGING SYSTEM

(71) Applicant: Wen-Te Lin, Taoyuan (TW)

(72) Inventor: Wen-Te Lin, Taoyuan (TW)

( * ) Notice: Subject to any disclaimer, the term of this patent is extended or adjusted under 35 U.S.C. 154(b) by 60 days.

(21) Appl. No.: 15/496,821

(22) Filed: Apr. 25, 2017

(65) Prior Publication Data

US 2018/0131209 A1 May 10, 2018

(30) Foreign Application Priority Data

Nov. 9, 2016 (TW) .............................. 105136446 A

(51) Int. Cl.
*H02J 7/00* (2006.01)
*H01M 10/46* (2006.01)
*H01M 2/10* (2006.01)

(52) U.S. Cl.
CPC ......... *H02J 7/0044* (2013.01); *H01M 2/1005* (2013.01); *H01M 10/46* (2013.01); *H02J 7/0021* (2013.01)

(58) Field of Classification Search
CPC ...... H02J 7/0044; H02J 7/0021; H01M 10/46; H01M 2/1005
USPC ....................................................... 320/107
See application file for complete search history.

(56) References Cited

U.S. PATENT DOCUMENTS

| | | | | |
|---|---|---|---|---|
| 9,350,003 | B2* | 5/2016 | Wen ..................... | H01M 2/1083 |
| 9,520,587 | B2* | 12/2016 | DeKeuster ............ | H01M 2/206 |
| 9,985,265 | B2* | 5/2018 | Tyler ..................... | H01M 2/206 |
| 2003/0170531 | A1* | 9/2003 | Bean .................. | H01M 2/1055 |
| | | | | 429/65 |
| 2016/0329542 | A1* | 11/2016 | Tyler ..................... | B23K 26/323 |
| 2017/0263903 | A1* | 9/2017 | Petrevski ............ | H01M 2/1077 |

FOREIGN PATENT DOCUMENTS

| | | |
|---|---|---|
| CN | 203617364 U | 5/2014 |
| CN | 204978727 U | 1/2016 |
| CN | 205508899 U | 8/2016 |

\* cited by examiner

*Primary Examiner* — M'Baye Diao
(74) *Attorney, Agent, or Firm* — Li & Cai Intellectual Property (USA) Office

(57) ABSTRACT

A battery cartridge, a battery carrier module, and a battery charging system are provided. The battery cartridge includes a carrier case and a dismantable assembly. The battery cartridge has an accommodating space for accommodating a rechargeable battery. The accommodating space has a maximum width and a maximum depth, the rechargeable battery has a predetermined width and a predetermined depth. The dismantable assembly is disposed in the accommodating space of the carrier case. The dismantable assembly includes a width adjustment part and a depth adjustment part. The maximum width and the maximum depth of the accommodating space are respectively greater than the predetermined width and the predetermined depth of the rechargeable battery, and one of the width adjustment part and the depth adjustment part is disposed between the carrier case and the rechargeable battery so as to maintain the relative position between the rechargeable battery and the carrier case.

10 Claims, 11 Drawing Sheets

BATTERY CARTRIDGE, BATTERY CARRIER MODULE, AND BATTERY CHARGING SYSTEM

BACKGROUND OF THE INVENTION

1. Field of the Invention

The present disclosure relates to a cartridge, a carrier module, and a charging system; more particularly, to a battery cartridge, a battery carrier module and a battery charging system.

2. Description of Related Art

Battery replacement of electric vehicles such as electric cars and golf carts is performed manually or via simple assistive devices. The batteries can be connected in series or in parallel so as to provide higher power, which can further be applied to other equipment, such as energy store systems (ESS).

There are a number of issues in conventional electric vehicles that remain to be improved. Taking electric motorcycles as an example, there exist different types of batteries for different kinds of electric motorcycles, and these different types of batteries cannot be standardized into one specification. One reason for this is: an electric motorcycle performs better when using a battery that is fully compatible with itself, which is often the battery manufactured by the same company that manufactures the electric motorcycle. Another reason is that it would be hard to clarify the attribution of responsibility if electric motorcycles of all kinds use the same type of battery. Therefore, it is still required that electric motorcycles of one brand use batteries of the same brand in the prior art, which could cause many problems such as inconvenience in the charging and exchanging of batteries.

SUMMARY OF THE INVENTION

Accordingly, the object of the present disclosure is to provide a battery cartridge, a battery carrier module, and a battery charging system, which utilize a dismantable assembly to maintain the relative position between the rechargeable battery and the carrier case, thereby enabling batteries of various kinds to be charged in the battery carrier module and the battery charging system of the present disclosure.

In order to achieve the aforementioned objects, the present disclosure provides a battery cartridge that includes a carrier case and a dismantable assembly. The carrier case includes an accommodating space for accommodating a rechargeable battery. The accommodating space has a maximum width and a maximum depth, and the rechargeable battery has a predetermined width and a predetermined depth. The dismantable assembly is disposed in the accommodating space of the carrier case and includes a width adjustment part and a depth adjustment part. The maximum width and the maximum depth of the accommodating space are respectively greater than the predetermined width and the predetermined depth of the rechargeable battery, and one of the width adjustment part and the depth adjustment part is disposed between the carrier case and the rechargeable battery so as to maintain the relative position between the rechargeable battery and the carrier case.

Another embodiment of the present disclosure provides a battery carrier module, which includes a cabinet and at least one battery cartridge. The cabinet has at least one battery-cartridge receiving space. The at least one battery cartridge is disposed in the cabinet. The at least one battery cartridge includes a carrier case and a dismantable assembly. The carrier case includes an accommodating space for accommodating a rechargeable battery. The accommodating space has a maximum width and a maximum depth, and the rechargeable battery has a predetermined width and a predetermined depth. The dismantable assembly is disposed in the accommodating space of the carrier case and includes a width adjustment part and a depth adjustment part. The maximum width and the maximum depth of the accommodating space are respectively greater than the predetermined width and the predetermined depth of the rechargeable battery, and one of the width adjustment part and the depth adjustment part is disposed between the carrier case and the rechargeable battery so as to maintain the relative position between the rechargeable battery and the carrier case.

Yet another embodiment of the present disclosure provides a battery charging system including a battery carrier module and at least one power supply module. The battery carrier module includes a cabinet and at least one battery cartridge disposed in the cabinet. The at least one battery cartridge includes a carrier case and a dismantable assembly. The carrier case includes an accommodating space for accommodating a rechargeable battery. The accommodating space has a maximum width and a maximum depth, and the rechargeable battery has a predetermined width and a predetermined depth. The dismantable assembly is disposed in the accommodating space of the carrier case and includes a width adjustment part and a depth adjustment part. The maximum width and the maximum depth of the accommodating space are respectively greater than the predetermined width and the predetermined depth of the rechargeable battery, and one of the width adjustment part and the depth adjustment part is disposed between the carrier case and the rechargeable battery so as to maintain the relative position between the rechargeable battery and the carrier case.

The present disclosure is advantageous in that the battery cartridge, the battery carrier module and the battery charging system of the present disclosure can maintain the relative position between the rechargeable battery and the carrier case via the manner in which the maximum width and the maximum depth of the accommodating space are respectively greater than the predetermined width and the predetermined depth of the rechargeable battery, and the technical means in which one of the width adjustment part and the depth adjustment part is disposed between the carrier case and the rechargeable battery. Through the aforementioned manner, rechargeable batteries of different specifications can be compatible with the battery cartridge, the battery carrier module and the battery charging system of the present disclosure and can be charged therein at the same time.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings. Furthermore, the directional terms such as "left", "right", "upper" or "lower" are used for the purpose of describing the drawings and shall not be deemed as limitations to the present disclosure.

The First Embodiment

Figure 1:
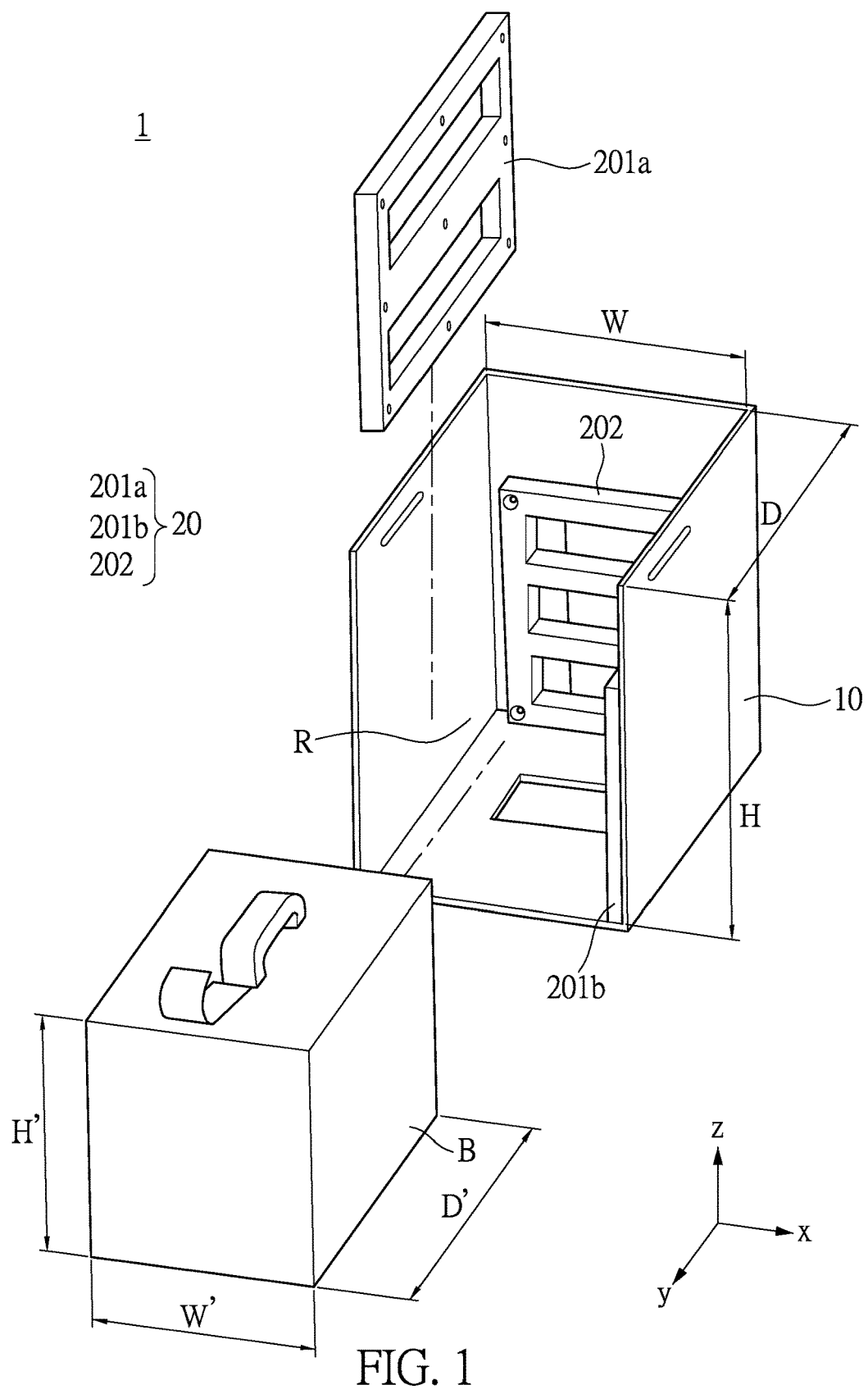
FIG. 1 is an exploded schematic view illustrating a battery cartridge for carrying a first rechargeable battery according to a first embodiment of the present disclosure.
Figure 2:
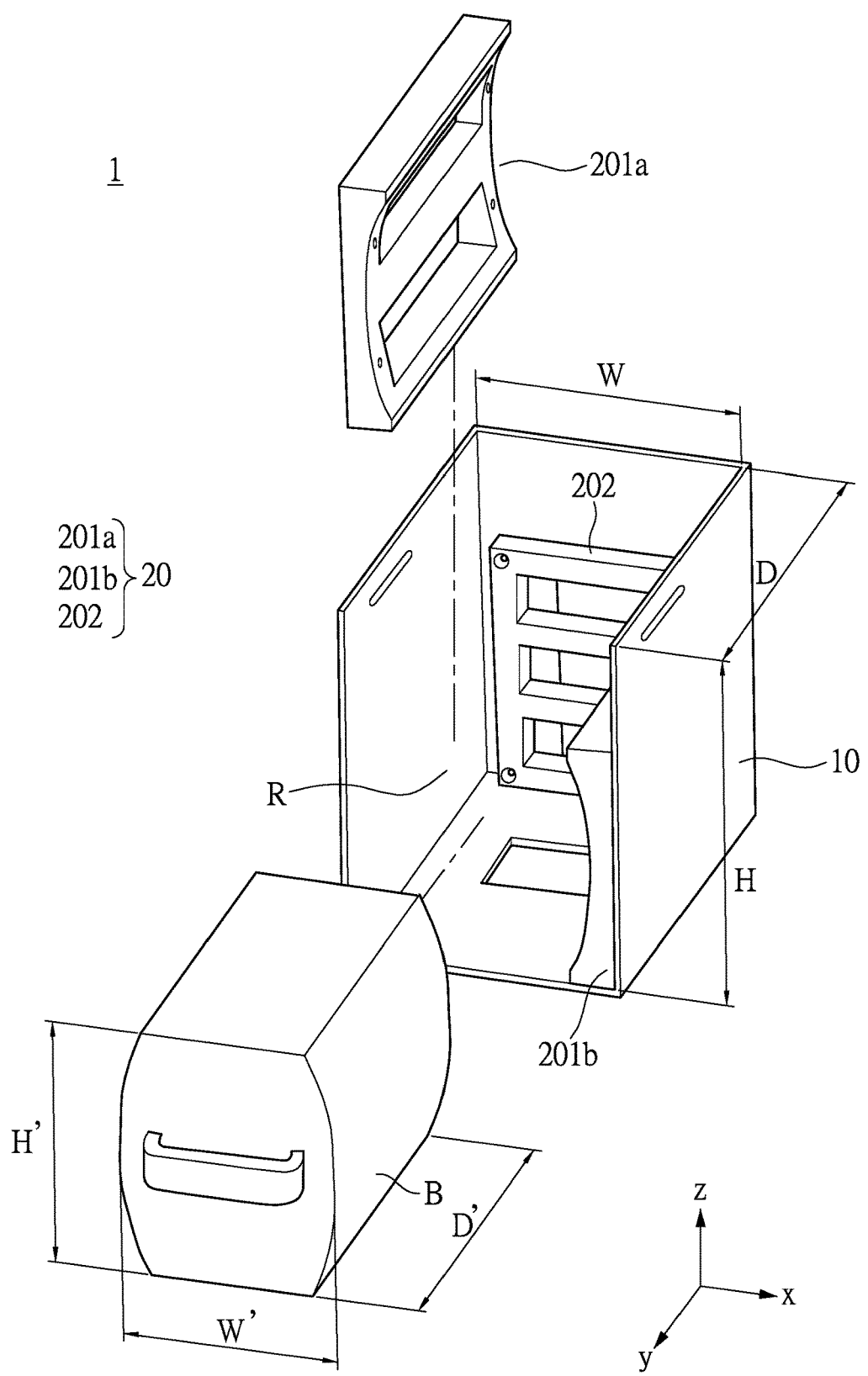
FIG. 2 is an exploded schematic view illustrating the battery cartridge for carrying a second rechargeable battery according to the first embodiment of the present disclosure.
Figure 3:
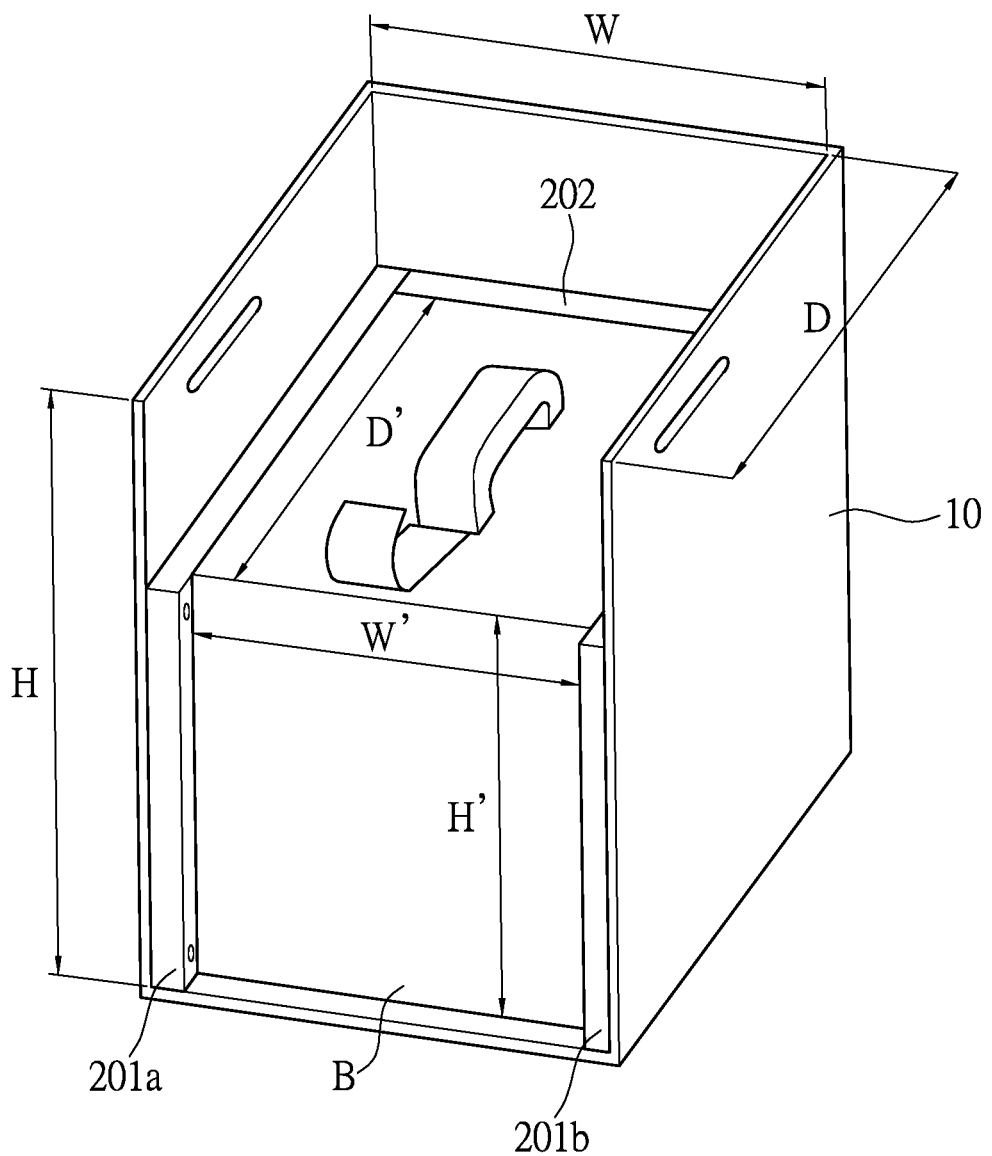
FIG. 3 is a schematic view illustrating the battery cartridge according to the first embodiment of the present disclosure carrying the first rechargeable battery.
Figure 4:
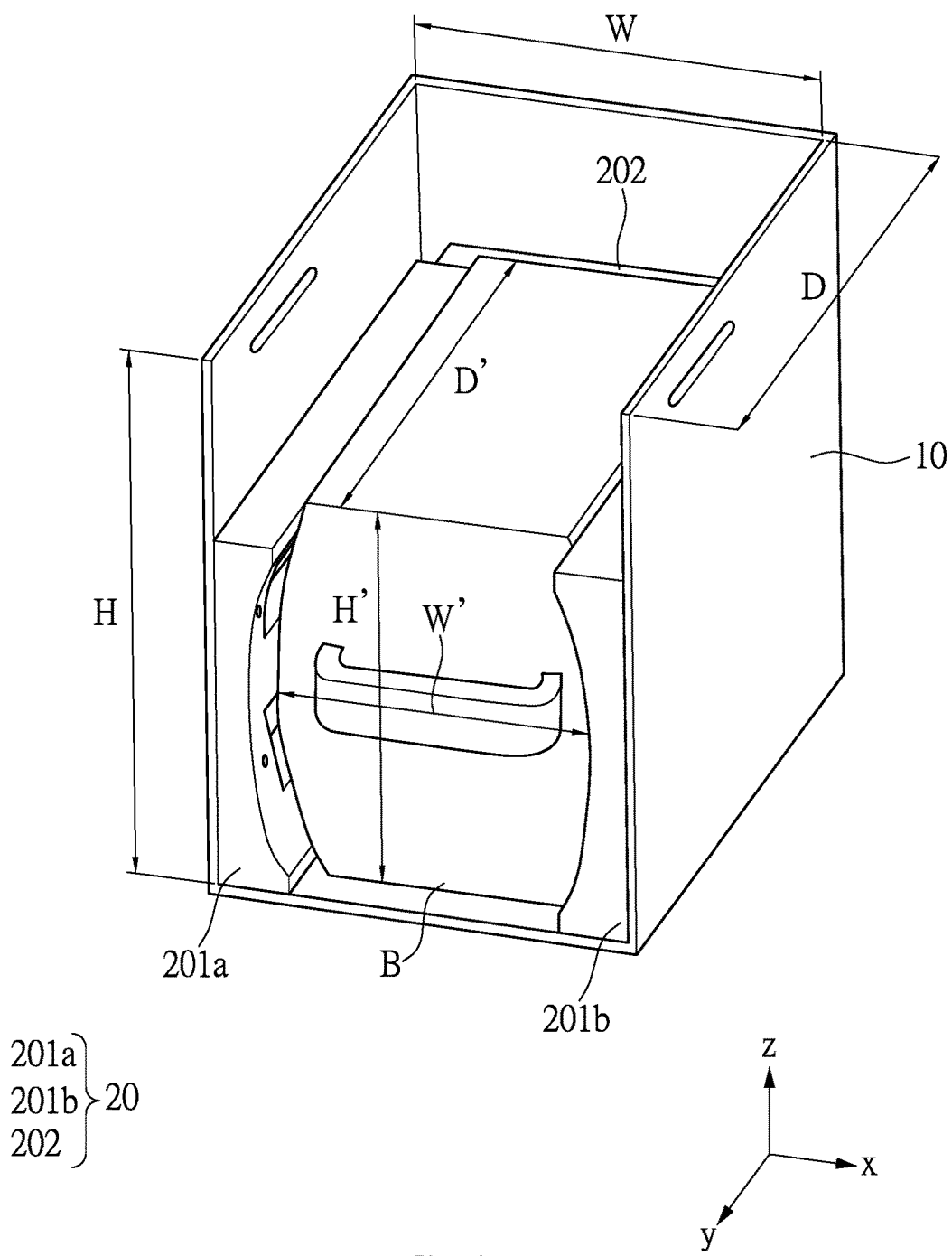
FIG. 4 is a schematic view illustrating the battery cartridge according to the first embodiment of the present disclosure carrying the second rechargeable battery.

Referring to FIG. 1 to FIG. 7, the present disclosure provides a battery cartridge 1 including a carrier case 10 and a dismantable assembly 20. The carrier case 10 includes an accommodating space R for accommodating a rechargeable battery B. Specifically, the rechargeable battery B can be a horizontally positioned battery or a vertically positioned battery. In FIG. 1, the rechargeable battery B is a horizontally positioned battery, and in FIG. 2, the rechargeable battery B is a vertically positioned battery. The rechargeable battery B can be placed into the accommodating space R by being pushed along a Y direction defined in an XYZ coordinate system. For example, FIG. 3 shows the rechargeable battery B of FIG. 1 after having been pushed into the accommodating space R along the Y direction, and FIG. 4 shows the rechargeable battery B of FIG. 2 after having been pushed into the accommodating space R along the Y direction of the XYZ coordinate system. The rechargeable battery can also be a battery having a size smaller than that of the rechargeable battery B shown in FIGS. 1 and 2.

Furthermore, the dismantable assembly 20 can be disposed in the accommodating space R of the carrier case 10. The dismantable assembly 20 includes a width adjustment part and a depth adjustment part 202. More specifically, the width adjustment part includes two width adjustment parts (201a, 201b). Furthermore, the accommodating space R has a maximum width W and a maximum depth D, and the rechargeable battery B has a predetermined width W' and a predetermined depth D'. The maximum width W and the maximum depth D of the accommodating space R are greater than the predetermined width W' and the predetermined depth D' of the rechargeable battery B respectively. In addition, one of the width adjustment part and the depth adjustment part 202 of the dismantable assembly 20 can be disposed between the carrier case 10 and the rechargeable battery B so as to maintain the relative position between the rechargeable battery B and the carrier case 10. That is to say, one of the width adjustment part and the depth adjustment part 202 can be disposed between the carrier case 10 and the rechargeable battery B, or both of the width adjustment part and the depth adjustment part 202 can be disposed between carrier case 10 and the rechargeable battery B so as to maintain the relative position between the rechargeable battery B and the carrier case 10.

More specifically, whether one or both of the width adjustment part and the depth adjustment part 202 are used depends on the size of the accommodating space R relative to that of the rechargeable battery B. With reference to FIGS. 1 to 8, in the present embodiment, both of the width adjustment part and the depth adjustment part 202 of the dismantable assembly 20 are used. However, the present disclosure is not limited thereto. In other embodiments, only one of the width adjustment part and the depth adjustment part 202 may be used, and the width adjustment part and the depth adjustment part 202 in other embodiments can have widths and lengths that are different from those of the width adjustment part and the depth adjustment part 202 of the present embodiment. With the dismantable assembly 20, the present disclosure provides alternative configurations when using the width adjustment part, which includes two width adjustment cushions (201a, 201b), and the depth adjustment part 202 to secure the position of the rechargeable battery B in the battery cartridge 1.

Figure 5:
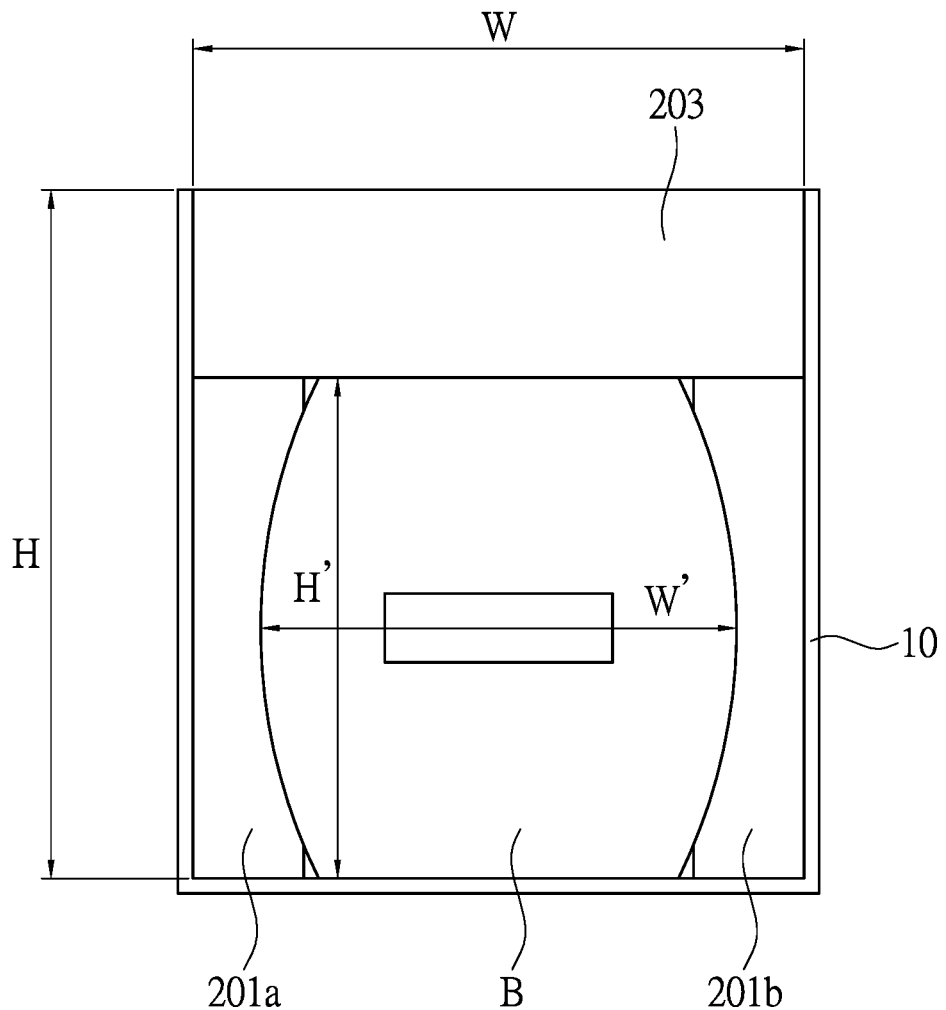
FIG. 5 is a side view illustrating the battery cartridge according to the first embodiment of the present disclosure when carrying the second rechargeable battery and using a height adjustment part.
Figure 5:
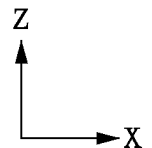
Figure 6:
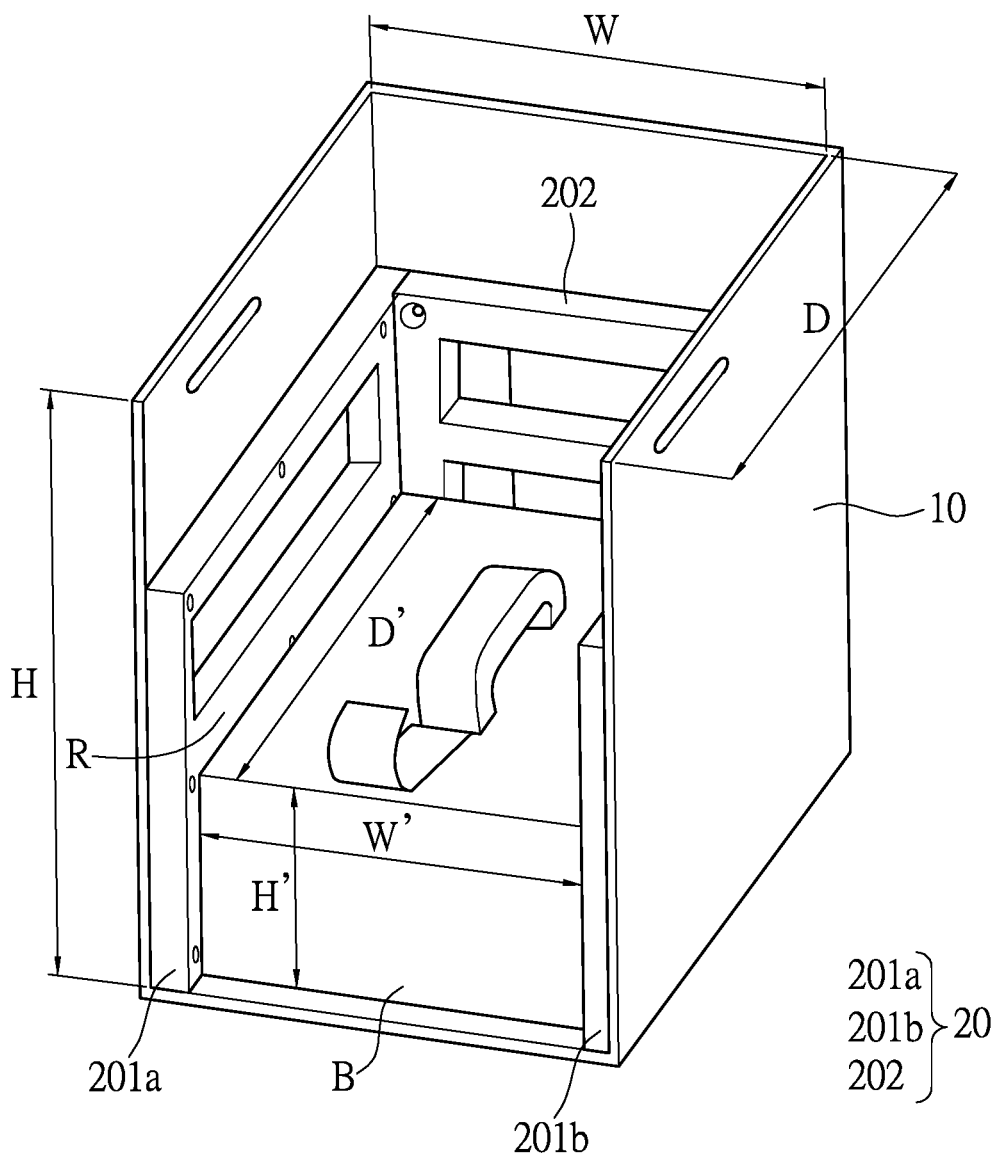
FIG. 6 is schematic view illustrating the battery cartridge according to the first embodiment of the present disclosure carrying a third rechargeable battery.
Figure 6:
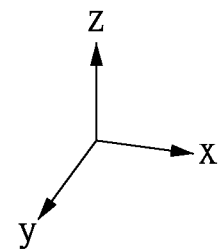
Figure 7:
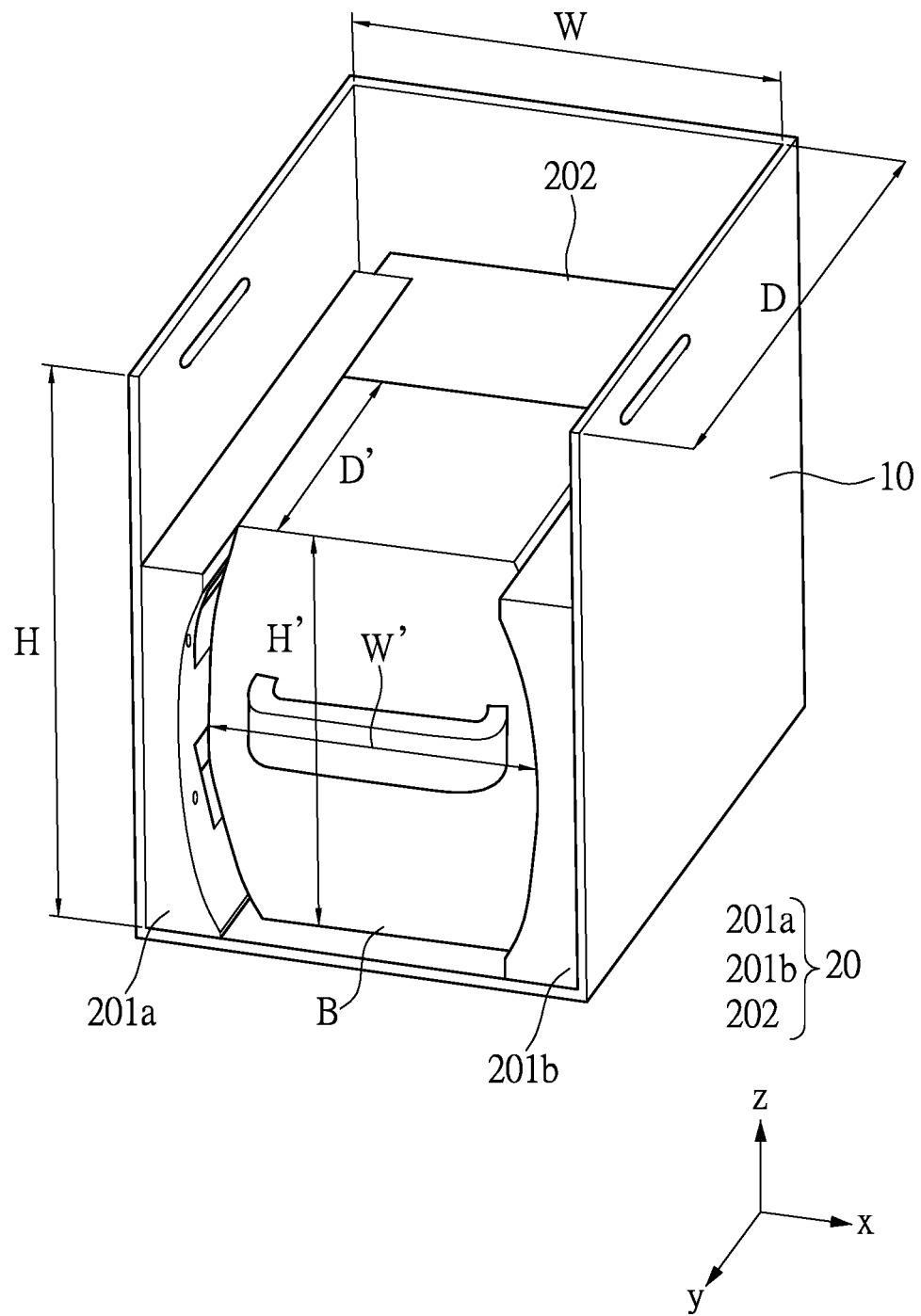
FIG. 7 is a schematic view of the battery cartridge according to the first embodiment of the present disclosure carrying a fourth rechargeable battery.

Referring to FIG. 5, the accommodating space R has a maximum height H, and the rechargeable battery B has a predetermined height H'. The maximum height H of the accommodating space R is greater than the predetermined height H' of the rechargeable battery B. Furthermore, the dismantable assembly 20 can include a height adjustment part 203 disposed between the carrier case 10 and the rechargeable battery B so as to maintain the relative position between the rechargeable battery B and the carrier case 10. Specifically, the Z-direction thickness of the height adjustment part 203 is greater than or equal to the difference between the maximum height H of the accommodating space R and the predetermined height H' of the rechargeable battery B. Accordingly, with the height adjustment part 203, the rechargeable battery B can be more securely positioned in the battery cartridge 1.

Figure 8:
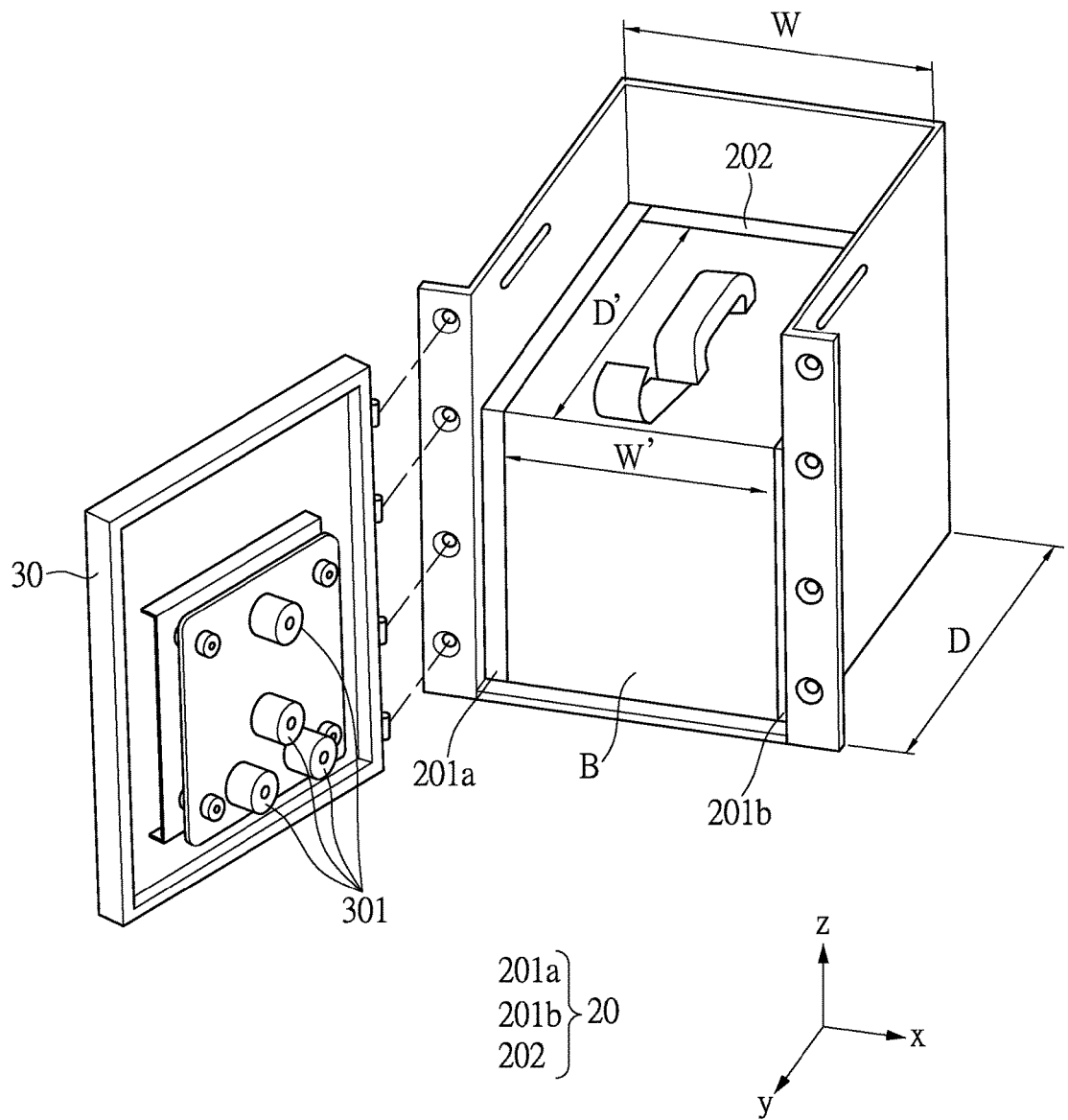
FIG. 8 is a schematic perspective view illustrating the battery cartridge with a front door according to the first embodiment of the present disclosure.

With reference to FIG. 8, the battery cartridge 1 further includes a front door 30 pivotally connected to the carrier case 10 so as to secure the rechargeable battery B. Specifically, the front door 30 includes a cushion 301 for abutting the rechargeable battery B. More specifically, when the front door 30 is closed, the cushion 301 abuts the rechargeable battery B towards the inside of the carrier case 10 such that the rechargeable battery B can be more securely positioned in the battery cartridge 1.

Second Embodiment

Figure 9:
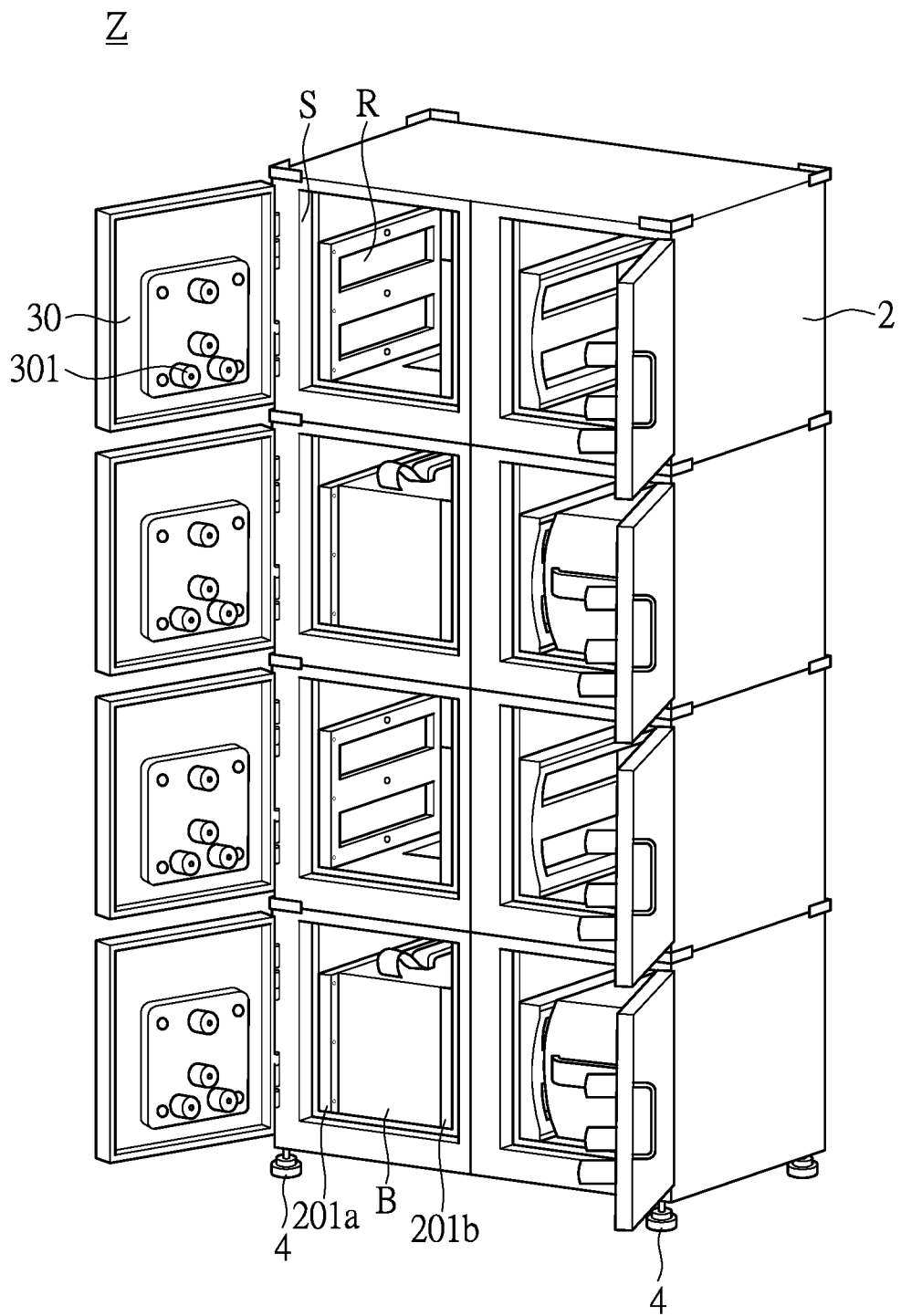
FIG. 9 is a schematic perspective view illustrating a battery carrier module according to a second embodiment of the present disclosure.
Figure 10:
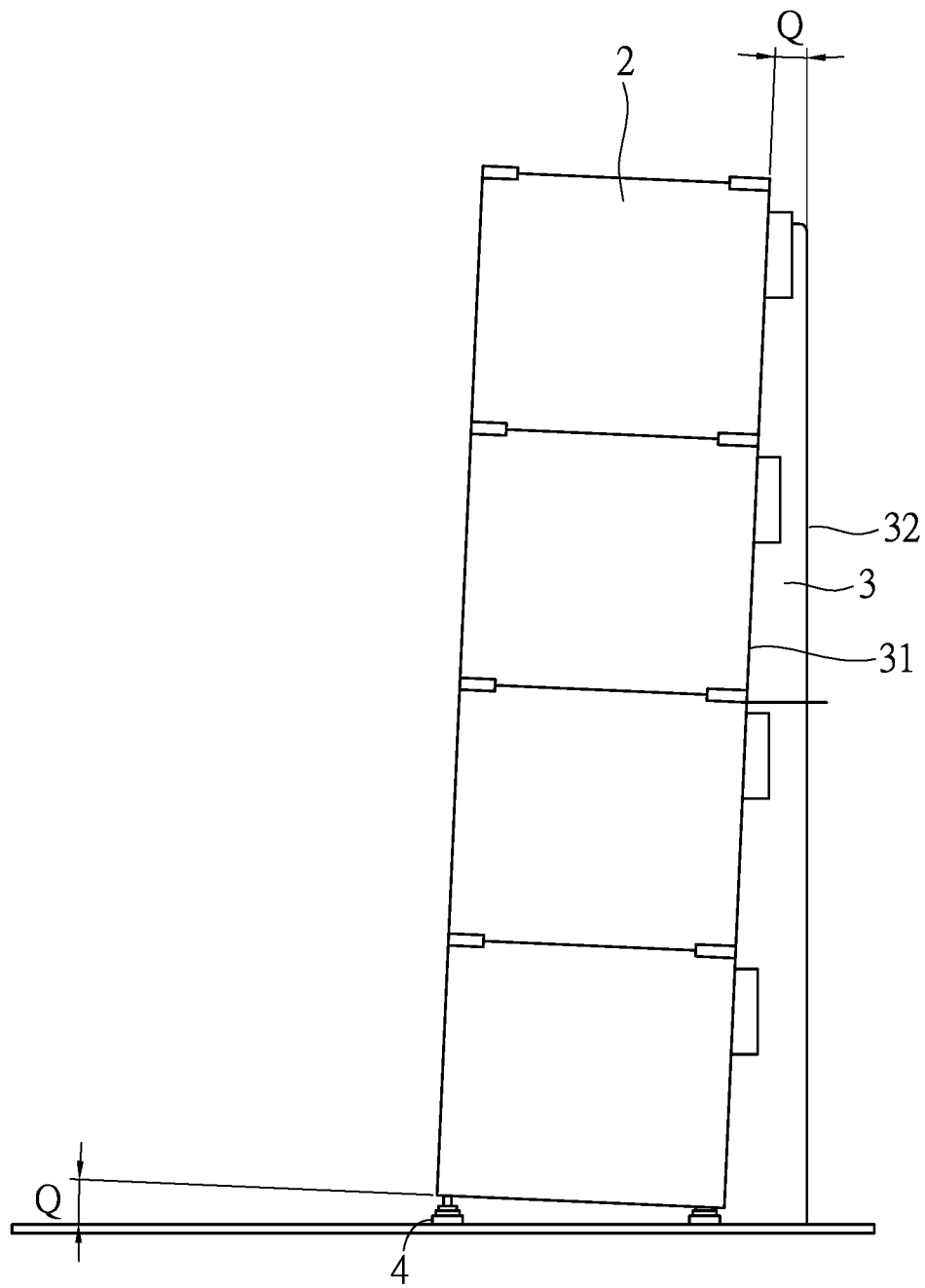
FIG. 10 is a side view illustrating the battery carrier module according to the second embodiment of the present disclosure.

Referring to FIGS. 8 to 10, the second embodiment of the present disclosure provides a battery carrier module Z, which includes a cabinet 2 and at least one battery cartridge 1. The cabinet 2 includes at least one battery-cartridge receiving space S. The at least one battery cartridge 1 is disposed in the cabinet 2, and each battery cartridge 1 includes a carrier case 10 and a dismantable assembly 20. Moreover, the carrier case 10 has an accommodating space R for accommodating the rechargeable battery B. The dismantable assembly 20 includes a width adjustment part and a depth adjustment part 202. Specifically, the width adjustment part includes two width adjustment cushions (201a, 201b).

Furthermore, the accommodating space R has a maximum width W and a maximum depth D, and the rechargeable battery B has a predetermined width W' and predetermined depth D'. The maximum width W and the maximum depth D of the accommodating space R are greater than the predetermined width W' and the predetermined depth D' of the rechargeable battery B respectively. One of the width adjustment part and the depth adjustment part 202 is disposed between the carrier case 10 and the rechargeable battery B so as to maintain the relative position between the rechargeable battery B and the carrier case 10.

With reference to FIG. 9, in the present embodiment, the cabinet 2 can accommodate up to eight battery cartridges 1, in which the integration of batteries with different specifications can be achieved with each battery cartridge 1 using the width adjustment cushions of different thicknesses according to the size of the rechargeable battery B. The working principles of the width adjustment cushions (201a, 201b) are similar to that of a feeler gauge. Needless to say, the second embodiment of the present disclosure can also include the height adjustment part 203 of the dismantable assembly 20 as described in the first embodiment so as to compensate for the height difference between the carrier case 10 and the rechargeable battery B.

Referring to FIG. 10, the battery carrier module Z further includes a leaning support 3 and a raising member 4. The leaning support 3 is disposed at a rear side of the cabinet 2 in a manner such that the cabinet 2 leans at a predetermined angle Q against the leaning support 3. The raising member 4 is disposed at the bottom of the cabinet 2 away from the leaning support 3. Specifically, the leaning support 3 has a slope 31 and a vertical surface 32. The vertical surface 32 is perpendicular to the ground, and the slope 31 forms a predetermined angle Q with the vertical surface 32. Through the above-mentioned manner, the cabinet 2 can lean at an angle against the leaning support 3 so that the rechargeable battery B can move smoothly towards the inside of the carrier case 10.

Referring to FIGS. 8 and 9, the battery cartridge 1 of the battery carrier module Z further includes a front door 30 pivotally connected to the cabinet 2 so as to abut the rechargeable battery B. In other embodiments, the front door 30 can also be pivotally connected to the carrier case 10. In this embodiment, the front door 30 includes a cushion 301 for abutting the rechargeable battery B so that the rechargeable battery B can be more securely positioned in the accommodating space R. More specifically, when the front door 30 is shut, the cushion 301 of the front door 30 abuts the rechargeable battery B towards the inside of the carrier case 10, thereby securing the relative position between the rechargeable battery B and the battery cartridge 1.

The Third Embodiment

Figure 11:
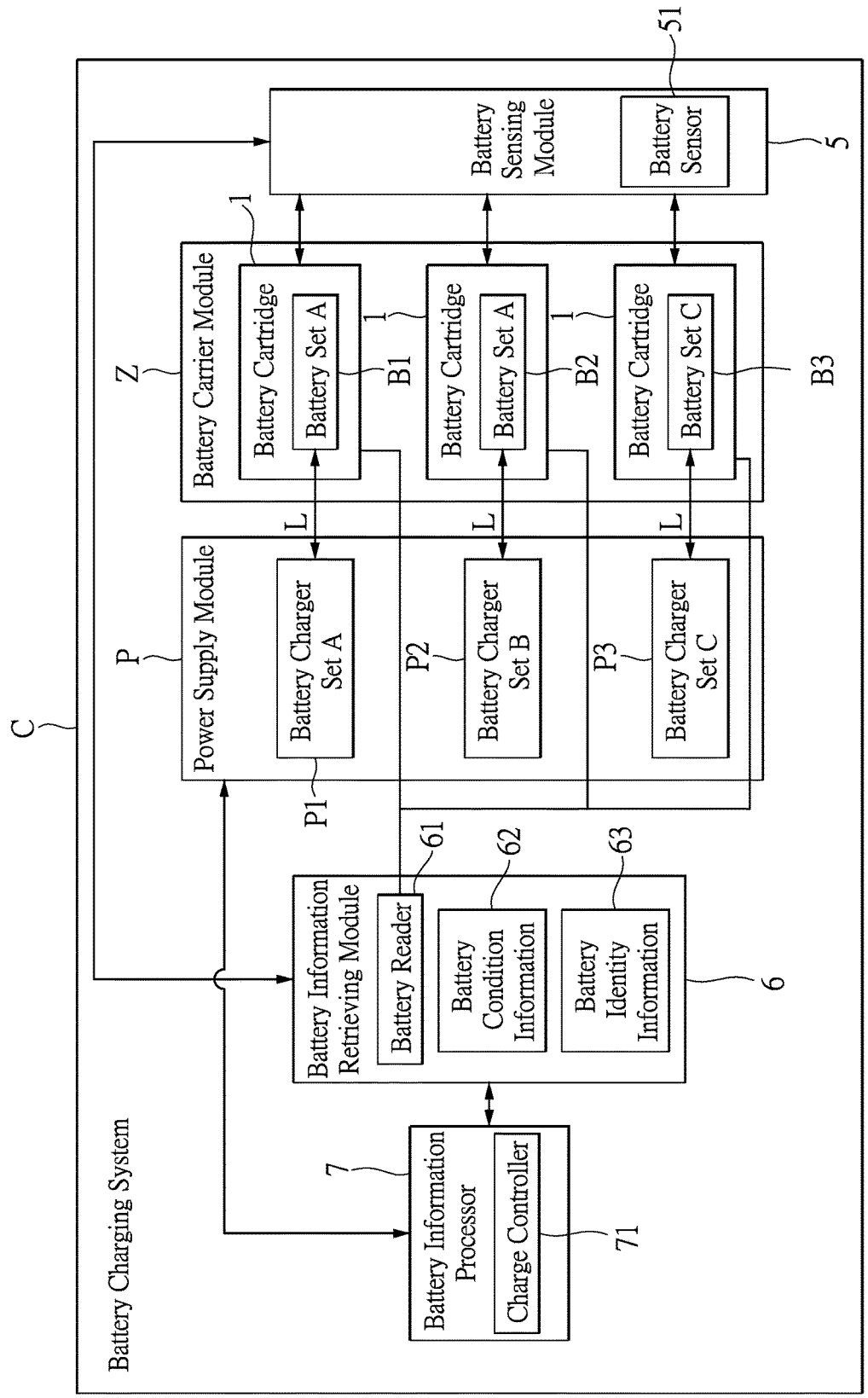
FIG. 11 is a function block diagram illustrating the battery charging system according to a third embodiment of the present disclosure.

With reference to FIG. 11, the third embodiment of the present disclosure provides a battery charging system C, which includes a battery carrier module Z and a power supply module P. The battery carrier module Z includes a cabinet 2 and at least one battery cartridge 1. The cabinet 2 includes at least one battery-cartridge receiving space S. The least one battery cartridge 1 is disposed in the cabinet 2 and includes a carrier case 10 and a dismantable assembly 20. The carrier case 10 has an accommodating space R for accommodating a rechargeable battery B. The dismantable assembly 20 is disposed in the accommodating space R of the carrier case 10 and includes a width adjustment part and a depth adjustment part 202. Specifically, the width adjustment part includes two width adjustment cushions (201a, 201b). In addition, the power supply module P includes at least one power supply wire L, which is connected to the at least one battery cartridge 1 so as to provide the rechargeable battery B with electricity.

Moreover, the accommodating space R has a maximum width W and a maximum depth D, and the rechargeable battery B has a predetermined width W' and a predetermined depth D'. The maximum width W and the maximum depth D of the accommodating space R are respectively greater than the predetermined width W' and the predetermined depth D' of the rechargeable battery B. One of the width adjustment part and the depth adjustment part 202 is disposed between the carrier case 10 and the rechargeable battery B so as to maintain the relative position between the rechargeable battery B and the carrier case 10.

For example, with reference to FIG. 11, the battery carrier module Z of the present embodiment carries batteries of three different brands, i.e. the battery set B1 of brand A, the battery set B2 of brand B, and the battery set B3 of brand C, each of which is connected via a power supply wire L to a battery charger set made by the same brand, i.e. the battery charger set P1 of brand A, the battery charger set P2 of brand B, and the battery charger set P3 of brand C.

Moreover, the battery charging system C further includes a battery sensor module 5 having a battery sensor 51 connected to the battery cartridge 1 so as to determine if the rechargeable batteries (B1, B2, B3) is in an abnormal state or at an unusually high temperature when being charged.

Furthermore, the battery charging system C includes a battery reading module 6 having a battery reader 61 connected to the battery cartridge 1 so as to retrieve the identity data of the rechargeable battery B. Specifically, the identity data of the rechargeable batteries (B1, B2, B3) include battery working data 62 and battery identification data 63.

In addition, the battery charging system C can further include a control processor 7 disposed in the cabinet 2 and connected to the battery reader 61 of the battery reading module 6 and the battery charger sets (P1, P2, P3). The control processor 7 can process the battery working data 62 and the battery identification data 63 and then generate a charging information that is further sent to the charging controller 71. Specifically, the charging controller 71 commands the battery charger sets (P1, P2, P3) to charge the rechargeable batteries (B1, B2, B3) according to the charging information.

In summary, the present disclosure is advantageous in that the battery cartridge 1, the battery carrier module Z and the battery charging system C of the present disclosure can maintain the relative position between the rechargeable battery B and the carrier case 10 via the manner in which the maximum width W and the maximum depth D of the accommodating space R are respectively greater than the predetermined width W' and the predetermined depth D' of the rechargeable battery B, and the manner in which one of the width adjustment part and the depth adjustment part 202 is disposed between the carrier case 10 and the rechargeable battery B. Through the afore-mentioned manner, rechargeable batteries of different specifications can be compatible with the battery cartridge, the battery carrier module and the battery charging system of the present disclosure and can be charged therein at the same time.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A battery cartridge, comprising:
   a carrier case, including an accommodating space for accommodating a rechargeable battery, the accommodating space having a maximum width and a maximum depth, the rechargeable battery having a predetermined width and a predetermined depth; and
   a dismantable assembly disposed in the accommodating space of the carrier case, the dismantable assembly including a width adjustment part and a depth adjustment part;
   wherein the maximum width and the maximum depth of the accommodating space are respectively greater than the predetermined width and the predetermined depth of the rechargeable battery, one of the width adjustment part and the depth adjustment part being disposed between the carrier case and the rechargeable battery so as to maintain the relative position between the rechargeable battery and the carrier case.

2. The battery cartridge according to claim 1, wherein the other one of the width adjustment part and the depth adjustment part is disposed between the carrier case and the rechargeable battery so as to maintain the relative position between the rechargeable battery and the carrier case.

3. The battery cartridge according to claim 1, wherein the accommodating space has a maximum height and the rechargeable battery has a predetermined height, in which the maximum height of the accommodating space is greater than the predetermined height of the rechargeable battery.

4. The battery cartridge according to claim 1, further comprising a front door pivotally connected to the carrier case so as to abut the rechargeable battery, wherein the front door includes a cushion for abutting the rechargeable battery.

5. A battery carrier module, comprising:
   a cabinet having at least one battery-cartridge receiving space; and
   at least one battery cartridge, the at least one battery cartridge being disposed in the cabinet, wherein the battery cartridge includes:
   a carrier case, including an accommodating space for accommodating a rechargeable battery, the accommodating space having a maximum width and a maximum depth, the rechargeable battery having a predetermined width and a predetermined depth; and
   a dismantable assembly disposed in the accommodating space of the carrier case, the dismantable assembly including a width adjustment part and a depth adjustment part;
   wherein the maximum width and the maximum depth of the accommodating space are respectively greater than the predetermined width and the predetermined depth of the rechargeable battery, one of the width adjustment part and the depth adjustment part being disposed between the carrier case and the rechargeable battery so as to maintain the relative position between the rechargeable battery and the carrier case.

6. The battery carrier module according to claim 5, further comprising:
   a leaning support disposed at a rear side of the cabinet in a manner such that the cabinet leans at a predetermined angle against the leaning support; and
   a raising member disposed at the bottom of the cabinet away from the leaning support.

7. The battery carrier module according to claim 5, wherein the at least one battery cartridge further includes: a front door pivotally connected to the carrier case so as to abut the rechargeable battery, wherein the front door includes a cushion for abutting the rechargeable battery.

8. A battery charging system, comprising:
   a battery carrier module including a cabinet and at least one battery cartridge disposed in the cabinet, wherein the battery cartridge includes:
   a carrier case, including an accommodating space for accommodating a rechargeable battery, the accommodating space having a maximum width and a maximum depth, the rechargeable battery having a predetermined width and a predetermined depth; and
   a dismantable assembly disposed in the accommodating space of the carrier case, the dismantable assembly including a width adjustment part and a depth adjustment part; and
   a power supply module, including at least one power supply wire, in which the at least one power supply wire is electrically connected to the at least one battery cartridge so as to provide the rechargeable battery with electricity;
   wherein the maximum width and the maximum depth of the accommodating space are respectively greater than the predetermined width and the predetermined depth of the rechargeable battery, one of the width adjustment part and the depth adjustment part being disposed between the carrier case and the rechargeable battery so as to maintain the relative position between the rechargeable battery and the carrier case.

9. The battery charging system according to claim 8, further comprising: a battery sensor module having a battery sensor connected to the at least one battery cartridge so as to determine if the rechargeable battery, when being charged, is in an abnormal state or at an unusually high temperature.

10. The battery charging system according to claim 8, further comprising: a battery reading module having a battery reader connected to the at least one battery cartridge so as to retrieve the identity data of the rechargeable battery.

* * * * *